Nov. 12, 1968   J. T. BELL   3,410,050
VACUUM LOADING MACHINE
Filed Aug. 30, 1965   7 Sheets-Sheet 4
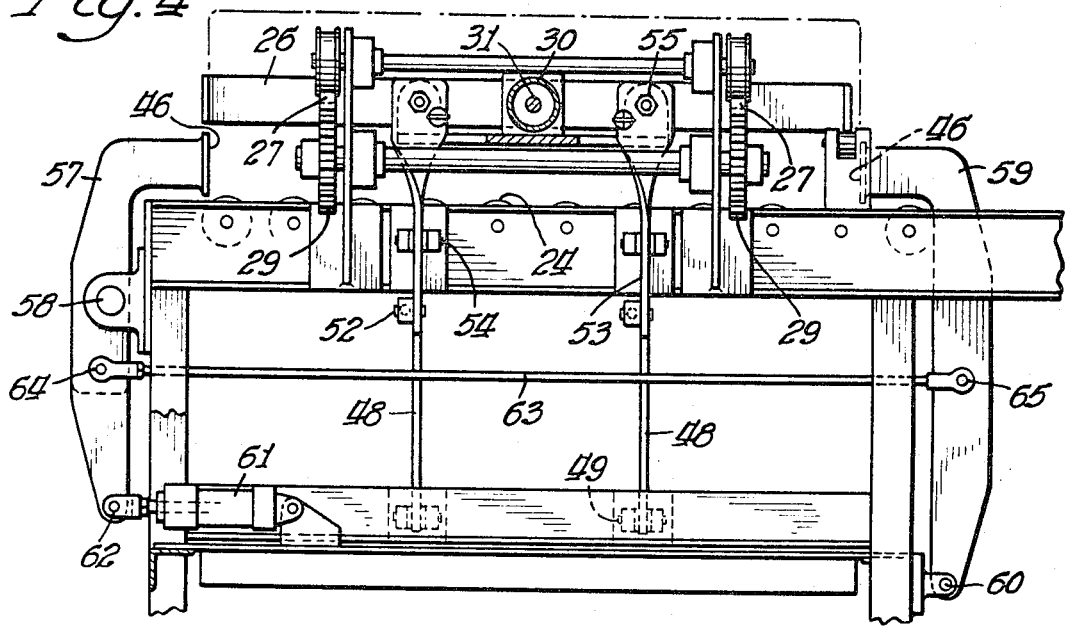
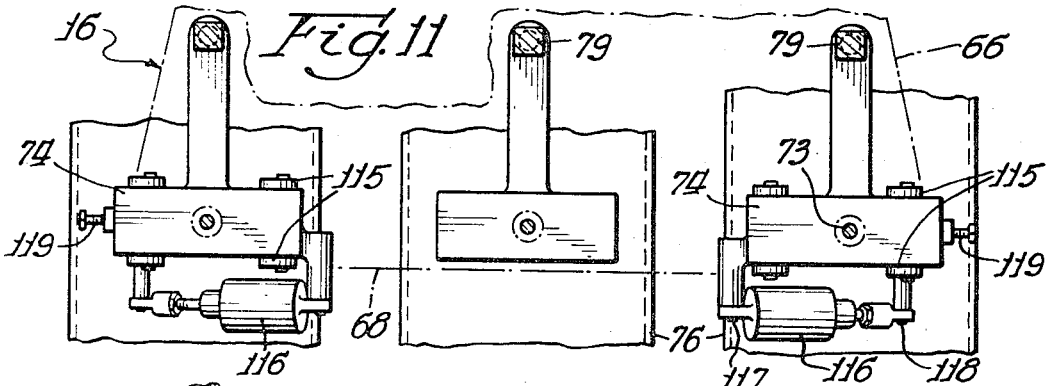
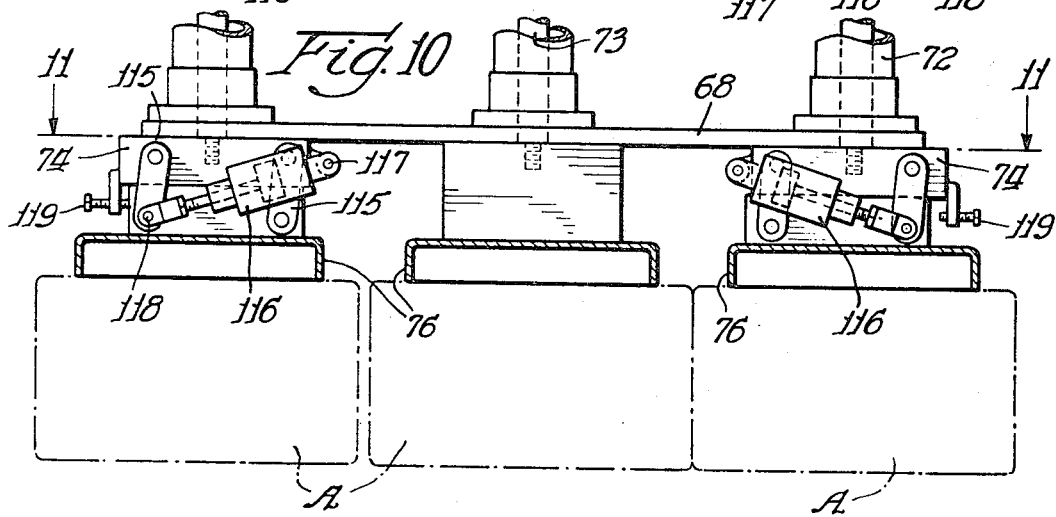

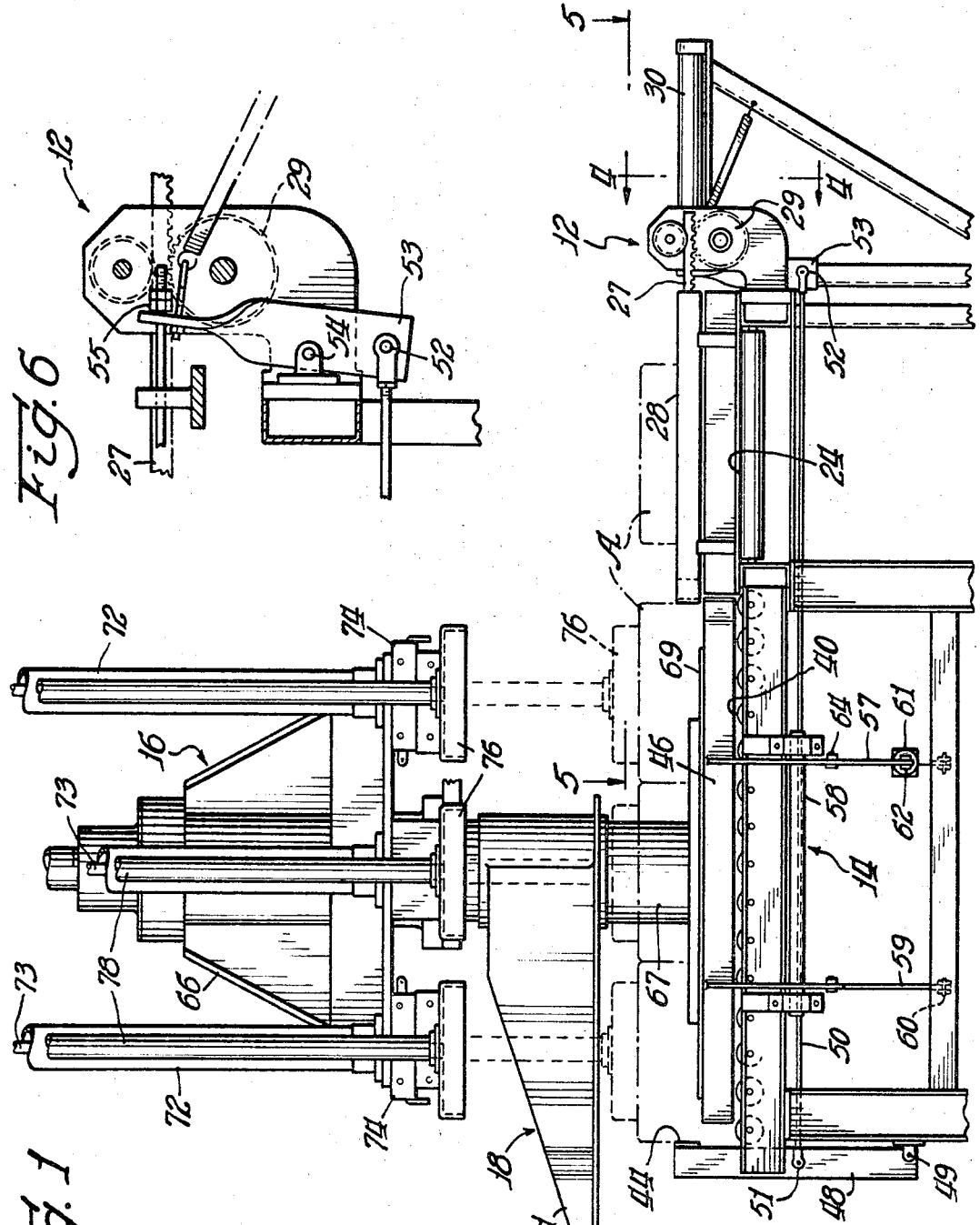

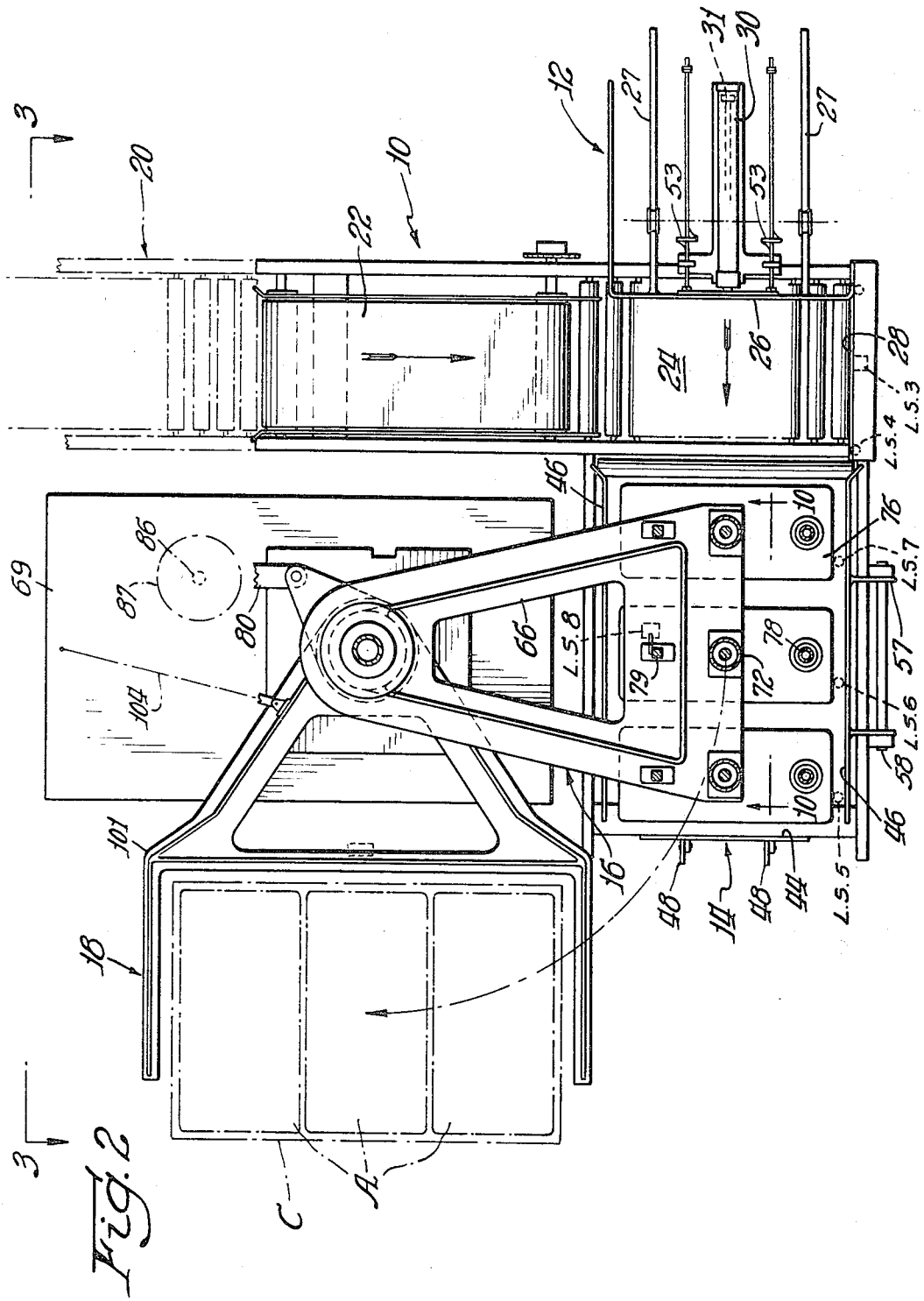

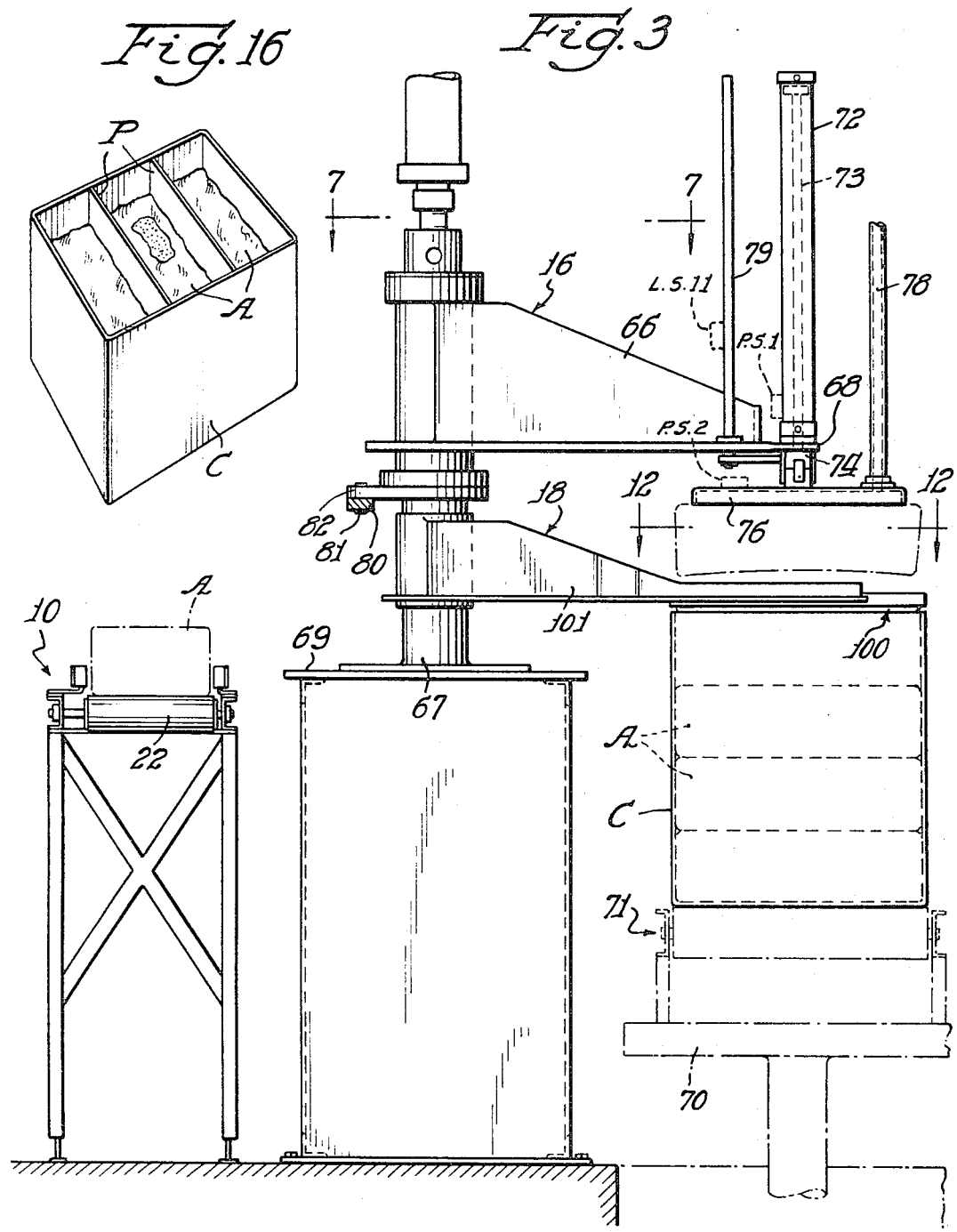

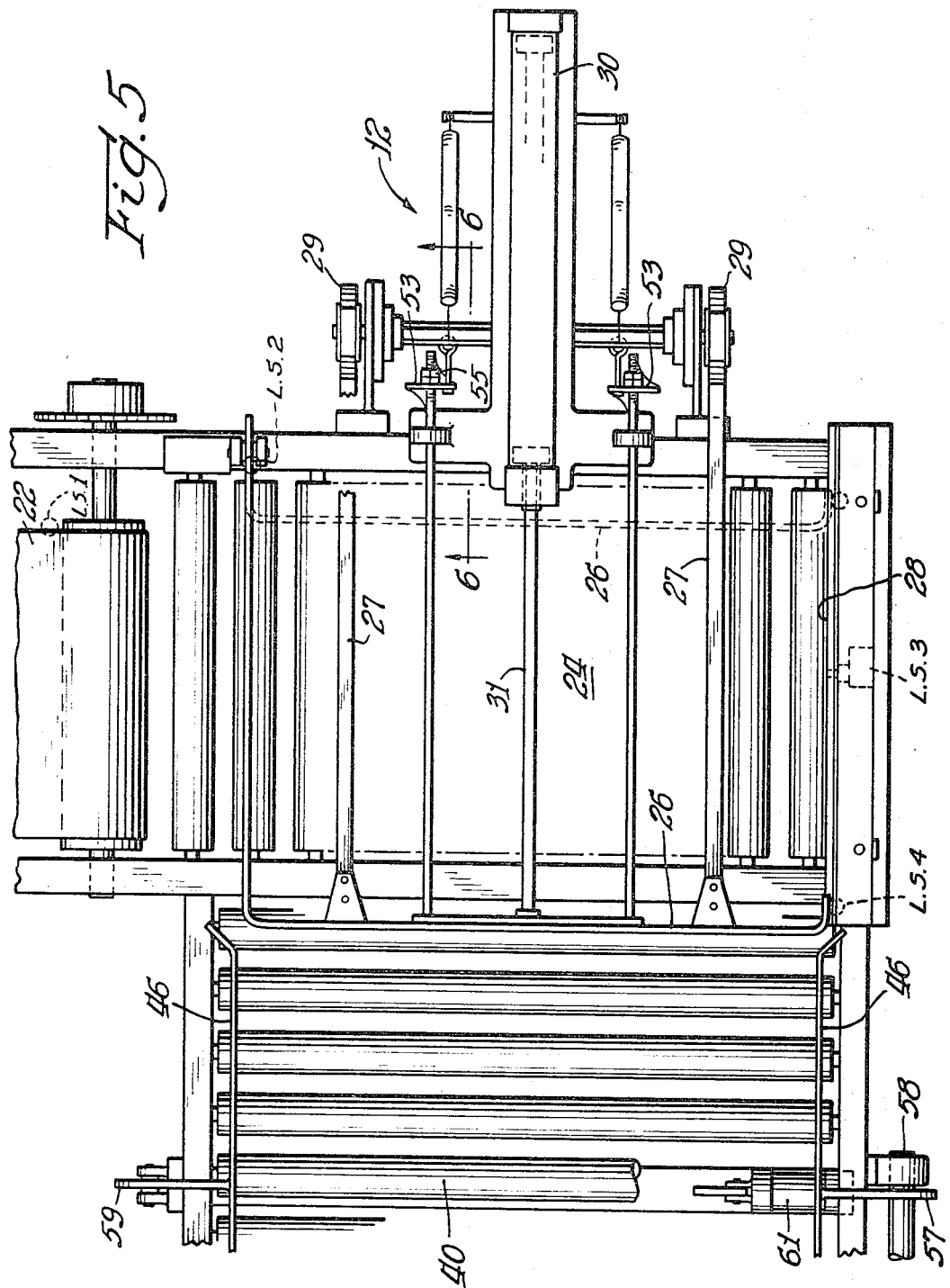

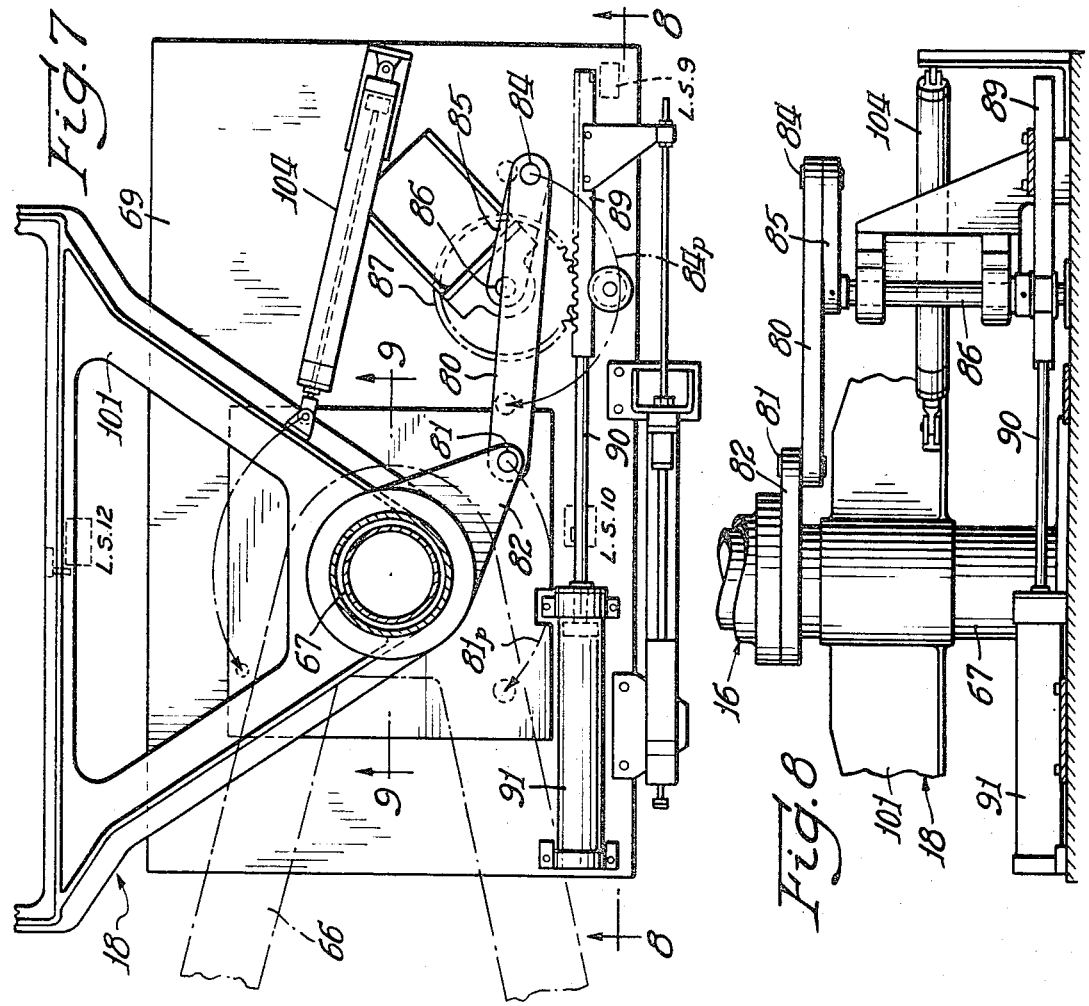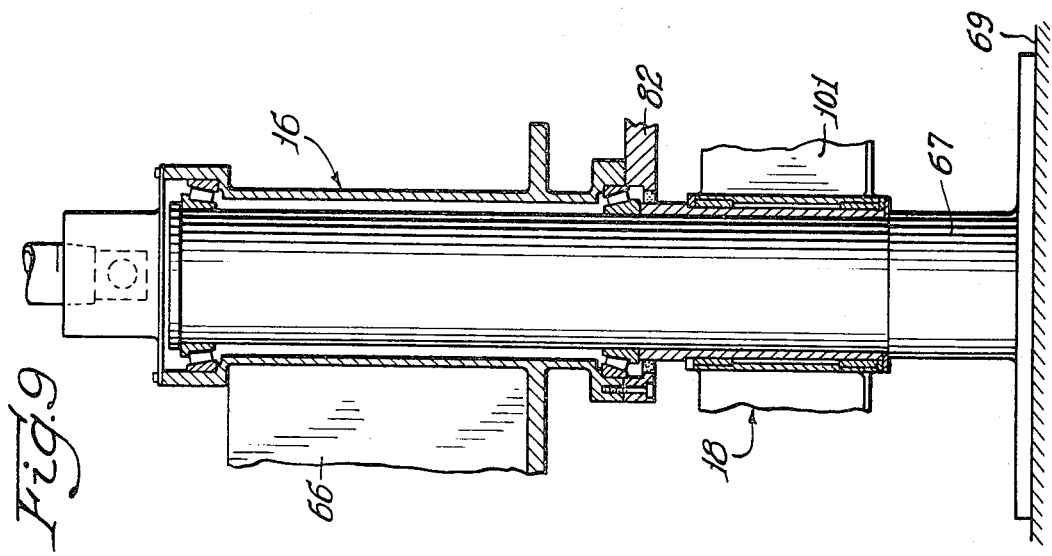

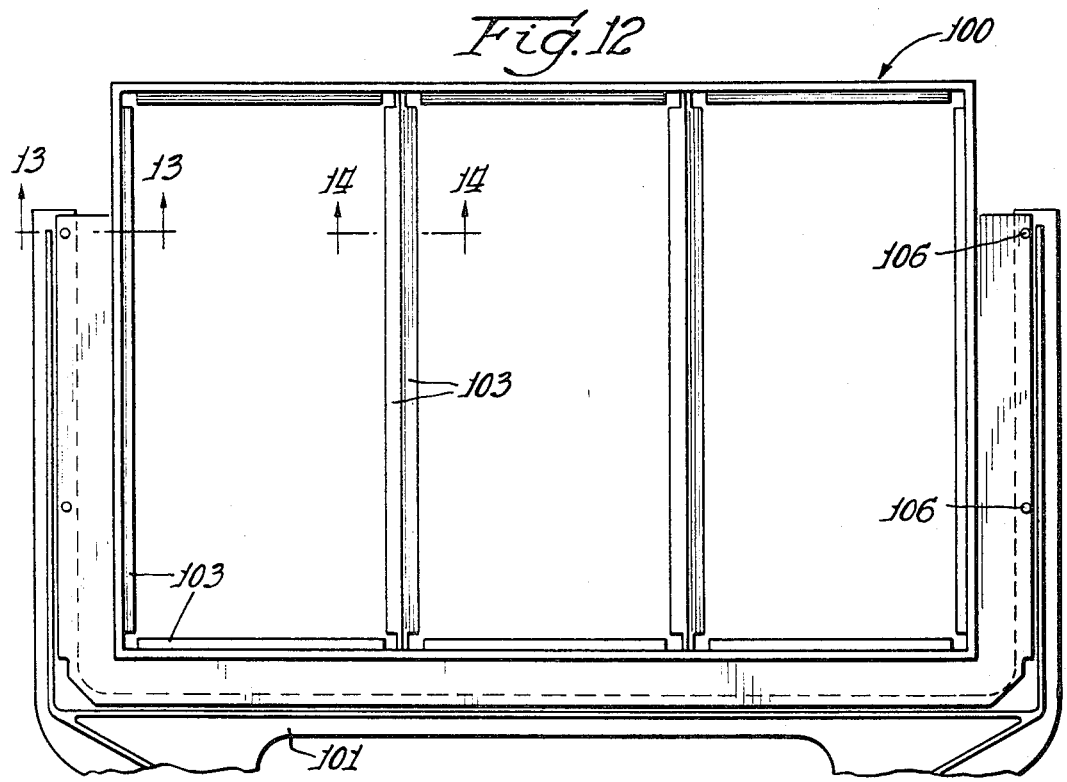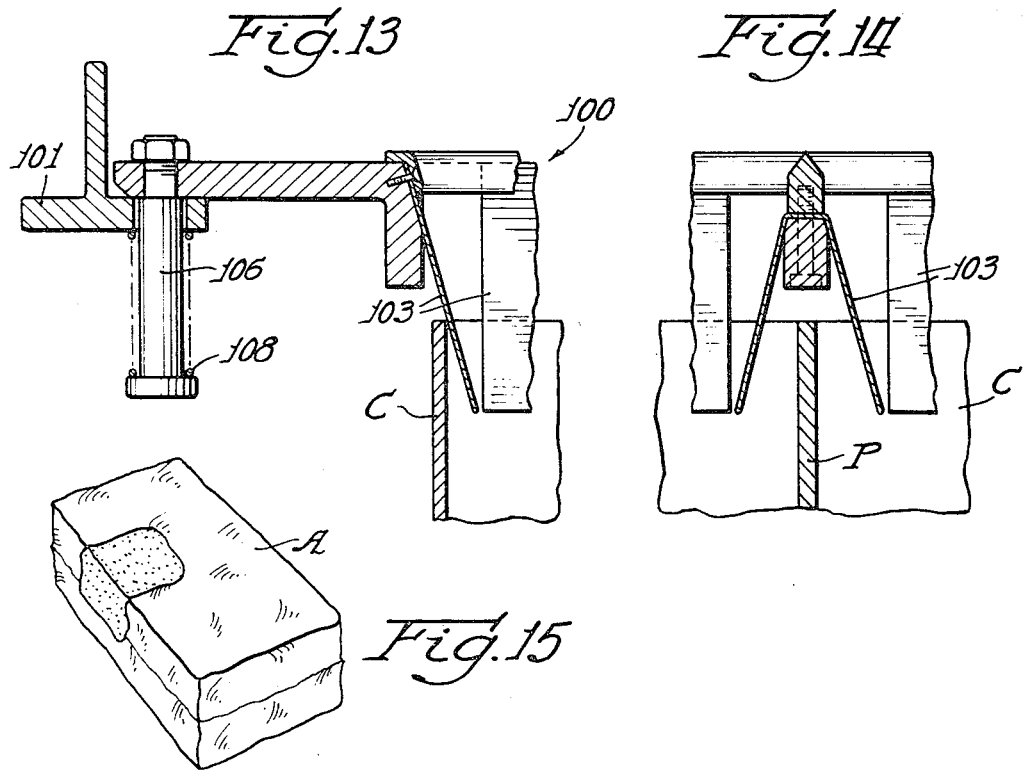

United States Patent Office 3,410,050
Patented Nov. 12, 1968

3,410,050
VACUUM LOADING MACHINE
John T. Bell, Lombard, Ill., assignor to Container Corporation of America, Chicago, Ill., a corporation of Delaware
Filed Aug. 30, 1965, Ser. No. 483,645
10 Claims. (Cl. 53—165)

ABSTRACT OF THE DISCLOSURE

This invention relates to a machine for loading, into an open top container, articles of the type that can be lifted by vacuum, and more particularly, to a machine having means for accumulating such articles and having means including an oscillating support arm and vertically movable vacuum heads for transferring the articles from the accumulating means to the container.

---

This machine is designed for articles which can be vacuum lifted, such articles typically being either in the form of an unwrapped but non-porous article, such as a bale of rubber, or an article wrapped in a non-porous material, such as a plastic film or treated paperboard. One benefit of vacuum lifting is that a suitably designed vacuum gripping head can be designed to grip the article without overhanging the edges of the article. This lends itself to direct vertical insertion of the articles into the open top container.

The basic object of this invention is to provide a machine for loading, either individually or as a group, articles of the type that can be vacuum lifted into an open top container.

Another object of this invention is to provide a vacuum loading machine that is compact and has structure that, to a large extent, can be moved clear of the container to provide maximum accessibility to the container.

Another object of this invention is to provide a vacuum loading machine that operates automatically to collect articles as a group and to thereafter transfer the articles as grouped into container.

Another object of this invention is to provide a vacuum loading machine that can lift as a group a number of contacting articles, and that thereafter can separate each article slightly from one another to permit the articles to be inserted freely onto a compartmented container on opposite sides of the partitions thereof.

Another object of this invention is to provide a vacuum loading machine having automatically operated control means to reverse the stroke of a power cylinder means, at various locations along the stroke, when the power cylinder means has stalled.

These and other objects will be more fully understood and appreciated after reference to the following specification, including as a part thereof the following drawings, wherein:

FIG. 1 (Sheet 1) is a front elevational view of the subject machine;

FIG. 2 (Sheet 2) is a top plan view of the machine;

FIG. 3 (Sheet 3) is a rear elevational view of the machine, as seen generally from line 3—3 of FIG. 2 (Sheet 2);

FIG. 4 (Sheet 4) is a partial end elevational view of the machine, as seen from line 4—4 of FIG. 1 (Sheet 1);

FIG. 5 (Sheet 5) is a partial top plan view of the machine, as seen from line 5—5 of FIG. 1 (Sheet 1);

FIG. 6 (Sheet 1) is an elevational sectional view of the machine, as seen generally from line 6—6 of FIG. 5 (Sheet 5);

FIG. 7 (Sheet 6) is a partial top plan view of the machine, as seen from line 7—7 of FIG. 3 (Sheet 3);

FIGS. 8 and 9 (Sheet 6) are elevational sectional views of the machine, as seen generally, respectively, from lines 8—8 and 9—9 of FIG. 7 (Sheet 6);

FIG. 10 (Sheet 4) is a partial elevational sectional view of the machine, as seen generally from line 10—10 of FIG. 2 (Sheet 2);

FIG. 11 (Sheet 4) is a partial top plan view of the mechanism of FIG. 10 (Sheet 4);

FIG. 12 (Sheet 7) is a partial top plan view of the machine, as seen generally from line 12—12 of FIG. 3 (Sheet 3);

FIGS. 13 and 14 (Sheet 7) are elevational sectional views as seen, respectively, from lines 13—13 and 14—14 of FIG. 12 (Sheet 7);

FIG. 15 (Sheet 7) is a perspective view of a typical article (bale of rubber) that can be handled by this machine; and FIG. 16 (Sheet 3) is a perspective view of a typical compartmented container into which such articles can be loaded by this machine.

Referring now to FIGS. 1, 2, and 3 of the drawings, note that the machine includes a feed conveyor 10, a transverse pusher mechanism 12, an accumulating and centering device 14, a transfer device 16, and a loading horn 18. Each article (generally designated A and shown in FIG. 15, Sheet 7) is conveyed by feed conveyor 10 to the pusher mechanism 12, where it then is biased by the mechanism onto the accumulating device 14. After the group of articles desired has been accumulated, the group is centered on the accumulator. The transfer device 16 thereafter descends to grip the articles, elevates them, and swings them approximately 90° horizontally to vertical alignment over the container C (shown in phantom in FIGS. 2 and 3, and in perspective in FIG. 16, Sheet 3). Thereafter, the articles are lowered into the container and released, and the transfer device thereafter moved to vertical alignment over the accumulator to repeat the cycle. Appropriate controls responsive to the presence of articles or to the relative position of these components cycle the machine automatically for rapid loading of the articles into the container.

Referring now to the details of construction of the subject machine, the feed conveyor 10 includes a roller conveyor 20 suitable for conveying the articles from the production line or storage area in the user's plant to the machine, the roller conveyor in turn feeding a powered belt conveyor 22. The belt conveyor 22 is of a length to support only one article A at a time, and is such that it can be started or stopped as desired to control article loading onto the pusher mechanism 12.

The pusher mechanism 12 is disposed immediately adjacent the belt conveyor 22 and includes a support bed 24 and a pusher 26 movable over the bed 24. The bed 24 is formed by a plurality of rollers, and is sized to receive only one article at a time. A guard rail 28 is positioned at the end of the bed remote from the feed conveyor for stopping the articles that are pushed onto the bed. The pusher 26 is supported by appropriate structure, including rack 27 and pinion 29 to keep it squared, to move over the bed at an angle normal to the advance of the feed conveyor. The pusher is moved by a power cylinder 30 including a piston rod 31 to transfer the positioned article onto the accumulator and centering device 14.

The accumulating and centering device 14 includes a bed 40 disposed adjacent the pusher mechanism 12 for receiving the articles therefrom. The accumulator bed 40 is sized and shaped to correspond to the container C to be loaded so as to accommodate one tier of articles at a time. The bed can take the form of spaced rollers (FIG. 5). An end guard 44 (FIG. 1) upstands vertically from the accumulator bed 40 to stop the articles as they are conveyed onto the accumulator bed. Similarly, opposite side guards 46 are disposed at the opposite side edges of the accumulator bed. To fix the location of the articles relative to the accumulator bed, the opposite side guards 46 are interconnected by mechanical linkages and the end guard 44 and the pusher 26 are interconnected so as to move together equal amounts. Structures suitable for these connections are shown in FIGS. 1, 4, and 5, and 6.

Thus, end guard 44 (FIG. 1) is supported on lever 48 pivoted at its end 49. A rod 50 connected intermediate the ends of lever 48 at pivot 51 extends beneath the accumulator bed 40 and the pusher mechanism 12 and is pivoted to the lower end 51 of lever 53 (see FIG. 6). The lever 53 is intermediately supported on pivot 54, and is adapted to present its upper end adjacent the pusher mechanism structure. By means of properly located stop, such as nut 55, on the pusher mechanism structure, the leftward advance of the pusher (FIGS. 1 and 6) rotates the lever 53 counterclockwise to rotate thereby the lever 48 clockwise. By proper sizing and spacing of the levers, the pusher 26 and its associated end guard 44 each moves proportionately toward one another from opposite sides of the accumulator bed. Similarly, opposite side guards 46 (FIG. 4) are supported at the upper ends of levers 57 and 59 pivotally connected on pivots 58 and 60. Power cylinder means 61 is connected to the lower end 62 of lever 57, and rod 63 is connected at 64 and 65 to the levers. Extension of cylinder means 61 causes clockwise rotation of the lever 57 (as seen in FIG. 4) and simultaneously causes counterclockwise rotation of lever 59. Since the centering devices are operated entirely by cylinder means 30 and 61, the cylinder means will automatically stall because of the ultimate compression or centering of the articles.

Having thus described the manner in which the articles to beloaded are accumulated, the actual transfer device 16 will now be discussed. The transfer device includes a cantilever support arm 66 pivoted above vertical post 67 and presenting a free end 68 that can be moved to general vertical registry over the accumulator bed 40 and over the loading platform 70 (FIGS. 2 and 3) provided in the user's plant. The post 67 is supported on a base 69 (FIG. 3) to be rigid in use. It has been found both economical and practical to locate the loading platform in a pit or well in the plant floor. This reduces the height of the machine, while the container upon being loaded can be easily raised on the platform and moved onto a conveyor 71 to be transferred to a truck or rail car as desired.

Power cylinders 72, secured in general vertical alignment to the end 68 of support arm 66, each includes a movable rod 73 having a plate 74 secured thereto at its lower end. In the machine disclosed, there are three cylinders positioned in line with one another, providing an intermediate cylinder and two end cylinders. A vacuum head 76 is connected to each base plate 74 in general vertical alignment with its cylinder. Suitable vacuum lines 78 extend from a vacuum source (not shown) to the vacuum heads 76. Rods 79 extend to the base plates 74 to keep each plate from rotating about its cylinder.

Each cylinder means 72 can be extended to lower its vacuum head 76 against the article positioned therebeneath on the accumulator (see the phantom detail shown in FIG. 1). Upon drawing a vacuum in the vacuum head a firm connection is made between the head and the article. The centering device then is withdrawn to release the articles and the power cylinder means 72 is reversed to lift the articles from the accumulator bed. Thereafter, the support arm 66 can be rotated about the post 67 to bring the articles in vertical registry over the open top of the container C (see FIG. 2).

The support arm 66 preferably is rotated in a manner to accelerate the articles in a parabolic manner in transferring them from over the accumulator bed to over the container. Structure to effect such a powered rotation is shown in FIGS. 7, 8, and 9, and includes a link 80 supported at one end 81 on ear 82 secured to the support arm 66 and pivoted at its other end 84 to a link 85 keyed to shaft 86. A gear 87 is also keyed to shaft 86 to rotate as a unit with the link, and a rack 89 is supported to reciprocate adjacent and engage the gear 87. The rack is connected by rod 90 to power cylinder means 91. Leftward movement of the rod 90 (FIG. 7) displaces the rack 89 to the left to rotate the gear 87 and link 85 in a clockwise direction. This in turn moves the end 84 of link 82 on a circular path 84p to similarly move the ear connection 81 on a circular path 81p to rotate the ear 82 and support arm 66 in a clockwise direction about the post 67. By proper locating and sizing of the various components, harmonic acceleration of the support arm 66 occurs for a linear acceleration of the power cylinder means 91. The arm thus is moved to a position to bring the articles in vertical registry over the container.

Generally, the container is divided by partitions P into a plurality of cells, and the articles A are inserted into the container on opposite sides of the partitions. Since the centering devices compress the articles snugly against one another, the articles must be seperated to insert them into such a compartmented container.

To this end, a loading horn 100 is supported in vertical registry over the open top of the container and has inclined converging guides 103 that overlap the container wall and partition P adjacent each cell. This structure is shown in FIGS. 12, 13, and 14. The horn 100 is supported on a horn support arm 101 rotatably connected to post 67. The articles are guided by the horn into the container. Power cylinder 104 can rotate the support arm, when desired, such as when positioning the container on or removing the container from the platform. To reduce the possibility of damage to the horn support arm should the loading platform 70 be inadvertently raised when the horn is over the platform, a flexible connection is provided between the horn and arm. Thus, pins 106 permit limited upward movement of the horn from the support arm and coil compression springs 108 normally maintain the horn and the arm together. If additional protection is desired, a limit switch (not shown) can be actuated by separation of the arm and horn to stop the lift platform.

In addition to the loading horn device, it is also preferable to separate the articles themselves by the thickness of the partition P to permit easier insertion of the articles into the compartmented container. FIGS. 10 and 11 (Sheet 4) show a connection between the base plate 74 of each end cylinder and its vacuum head 76 suitable for this. Each connection includes substantially parallel links 115 pivoted at their opposite ends to the plate 74 and vacuum head 76. By swinging the links, the end vacuum head can be moved away from the adjacent head to separate the articles supported thereby. The separation can be affected positively by power cylinder means 116 connected between opposite pivotal connections 117 and 118, or can be affected by gravity. For gravity separation, the links are inclined slightly from the vertical downwardly toward the adjacent article and the weight of the article when supported by the links swings them to vertical to separate the articles. A light coil tension spring (not shown) would be connected between the opposite pivotal connection 117 and 118 in place of the cylinder means to keep the plate and vacuum head together when the article is not supported by the links. In both the positive cylinder and the gravity type embodiments, a stop 119 engaged by the vacuum head is used to adjust the degree of link swinging and thus article separation as desired. The intermediate vacuum head can be supported rigidly relative to its base plate, and only the end vacuum heads need be movable.

The machine is controlled automatically by appropriately located limit and pressure switches which are actuated sequentially by the various components of the machine. For example, belt conveyor 22 should be powered at all times other than when the pusher 26 is extended across the path of the conveyor and an article is on the conveyor to make sure that an article will be ready on the conveyor to be loaded onto the pusher assembly. To affect this control, limit switch L.S.–1 is located at the end of the belt conveyor to be closed by the article thereon when the article is adjacent the extended pusher mechanism 12. A second limit switch L.S.–2 is closed by the pusher mechanism only when the pusher is in its fully retracted or home position. Thus, unless L.S.–1 is closed and L.S.–2 is open, the belt will be running. Third and fourth limit switches, L.S.–3 and L.S.–4 are to operate the pusher mechanism. L.S.–3 is located at the end of the pusher bed 24, such as on guard 28, to be closed by an article in place on the bed. Responsive to limit switch L.S.–3 closing, pusher cylinder means 30 is activated to extend the pusher and transfer the article thereon to the accumulator bed 40. Limit switch L.S.–4 is closed by the pusher in its fully extended position to reverse the pusher to return it to its retracted position for the next article.

A control suitable for sensing a completed group of articles on the accumulator bed can take the form of limit switches L.S.–5, L.S.–6, and L.S.–7, each of which is closed by one article of the group. Thus, the simultaneous closing of the limit switches L.S.–5, L.S.–6, and L.S.–7 indicates that a complete group is accumulated on the bed 40. When this condition occurs, the power cylinder means 61 of the side-to-side centering device of the accumulator bed can be activated. This moves the side guards 46 toward one another to center the articles side-to-side relative to the accumulator bed. The end-to-end centering device is powered automatically by the cylinder means 30 of the pusher mechanism stalling before the end of its stroke. Also, the condition of having a complete group can activate power cylinders 72 to lower the vacuum heads 76 against the articles A.

A pressure switch P.S.–1 can be connected to the lower cylinder chamber of the power cylinder means 72 to sense the exhaust pressure in the chamber during the descent of the cylinder means. Upon the cylinder means 72 stalling by engagement with the article, the air pressure in the lower cylinder chamber approached zero, and this condition is sensed by pressure switch P.S.–1 to activate a vacuum control for drawing vacuum in the heads 76. A second pressure switch P.S.–2 connected to the vacuum heads can sense when the desired lifting vacuum is drawn to reverse the centering means power cylinders 30 and 61 and the transfer device power cylinders 72.

The transfer device power cylinders 72 are retracted completely to their uppermost elevated position, and a limit switch L.S.–8 is closed by the cylinders in this condition. Upon L.S.–8 closing, the article separating power cylinder 116 is activated to separate the adjacent articles. Similarly, power cylinder means 91 for the support arm 66 is activated to swing the arm from the aligned position over the accumulator bed 40 to the aligned position over the container C. Limit switches L.S.–9 and L.S.–10 on the support arm actuating rack 89 (FIG. 7) position the support arm accurately in vertical registry over the accumulator bed and container, respectively. Upon the support arm achieving vertical registry over the container C and limit switch L.S.–10 closing, transfer power cylinders 27 are extended to lower the articles into the container.

The power cylinders 72 are extended until they stall out on either the bottom of the container or the top of an article already positioned in the container, which stalling condition is sensed by pressure switch P.S.–1. This condition of the cylinder means 72 stalling when in alignment over the container bleeds the vacuum heads and further can direct a pulse of air under pressure to the vacuum heads to separate forcibly the vacuum head from the article. Similarly, this stalling condition of power cylinders 72 reverses the cylinders 72 to retract them until limit switch L.S.–8 closes. This retracted condition of the power cylinders reverses the article separating power cylinder 116 and the support arm power cylinder 91, which thereby rotates the arm 66 to vertical registry over the accumulator bed and closes limit switch L.S.–9. The cycle of the machine can then be repeated for subsequent tiers of articles as desired.

A further control can sense when the container has been completely loaded to terminate the machine. Thus, a limit switch L.S.–11, closed by the power cylinders 72 when the cylinders are stalled in positioning the top tier of articles, into the container, can be linked with the pressure switch P.S.–1 to indicate that the cylinders are stalling at this location. Under such condition, the machine can be stopped upon the support arm 66 being returned to alignment over the accumulator bed 40 and the limit switch L.S.–9 closing.

After the machine has completed its cycle, horn support arm power cylinder 104 can be activated to swing the arm from over the container to provide ready access to the container. The lift platform 70 can be moved as required to transfer the loaded container C to the conveyor 71. Afterward, an empty container can be properly positioned on the platform 71 and the machine re-cycled.

I claim:

1. A machine for loading, into a container, an article for vacuum lifting, such as a bale of rubber, comprising the combination of:
   (a) an accumulator bed for supporting the article;
   (b) a loading platform spaced horizontally from the accumulator bed for supporting said container;
   (c) a pusher mechanism including a support bed adjacent the accumulator bed and a pusher movable over the support bed;
   (d) means responsive to the pusher being fully retracted to position an article on the support bed;
   (e) means responsive to an article being positioned on the support bed to bias the pusher against said article for moving the same onto the accumulator bed;
   (f) means responsive to the pusher being extended its full stroke to retract the pusher;
   (g) a side guard upstanding from the accumulator bed opposite the pusher;
   (h) means connecting the pusher and side guard together to cause them to move toward one another proportioned distances to center the article on the accumulator bed;
   (i) a support arm mounted to oscillate about a vertical axis spaced from both the accumulator bed and loading platform to present, in a first position, its free end over the accumulator bed, and in a second position, its free end over said container;
   (j) a vertically disposed power cylinder secured to the free end of the support arm;
   (k) a vacuum head connected to the lower end of the power cylinder;
   (l) means responsive to an article being positioned on the accumulator bed to extend the power cylinder when the support arm is in the first position to lower the vacuum head against the article;
   (m) means responsive to the power cylinder stalling on the article to connect a vacuum to the vacuum head for establishing a firm connection between the head and article;
   (n) means responsive to a specified vacuum being drawn in the vacuum head to withdraw said side guards and to reverse the power cylinder;
   (o) means responsive to the power cylinder being retracted to swing the support arm to its second position to bring the article over the container;
   (p) means responsive to the support arm being in the second position to extend the power cylinder to lower the article into the container;

(q) means responsive to the power cylinder stalling on the container bottom or the article beneath to release the vacuum from the vacuum head and to reverse the power cylinder.

2. A loading machine according to claim 1, wherein other side guards upstand from the accumulator bed and extend generally between the first side guard and the extended pusher, and wherein means interconnecting the other side guards move them toward one another proportioned distances to center the article on the accumulator bed.

3. A loading machine according to claim 1, wherein said means to position the article on the support bed includes a conveyor disposed adjacent the support bed, and wherein means power the conveyor at all times other than when an article is on the conveyor and the pusher is extended.

4. A machine for loading, into a container, a plurality of articles suitable for vacuum lifting, such as bales of rubber, comprising the combination of:
 (a) an accumulator bed for supporting the articles;
 (b) a loading platform spaced horizontally from the accumulator bed for supporting said container;
 (c) a pusher mechanism including a support bed adjacent the accumulator bed and a pusher movable over the support bed;
 (d) a conveyor adjacent the support bed for supporting the articles thereon;
 (e) means responsive to the pusher being fully retracted to power the conveyor for positioning a first article on the support bed;
 (f) means responsive to said first article being positioned on the support bed to bias the pusher against said article for moving the same onto the accumulator bed;
 (g) means responsive to the pusher being extended and a second article being disposed on the conveyor adjacent the extended pusher to stop the conveyor;
 (h) means responsive to the pusher being extended its full stroke to retract the pusher;
 (i) means responsive to the pusher being retracted to start the conveyor for positioning the second article to the support bed to cause thereby said second article to be biased onto the accumulator bed;
 (j) a side guard upstanding from the accumulator bed opposite the pusher;
 (k) means connecting the pusher and side guard together to cause them to move toward one another proportioned distances to center the first and second articles on the accumulator bed;
 (l) a support arm mounted to oscillate about a vertical axis spaced from both the accumulator bed and loading platform to present, in a first position, its free end over the accumulator bed, and in a second position, its free end over said container;
 (m) first and second power cylinders secured to the free end of the support arm and vertically aligned with the first and second articles on the accumulator bed, respectively;
 (n) a vacuum head connected to the lower end of each power cylinder;
 (o) means responsive to both the first and second articles being positioned on the accumulator bed to extend the power cylinders to lower the vacuum heads against the articles;
 (p) means responsive to the power cylinders stalling on the articles to connect a vacuum to the vacuum heads for establishing a firm connection between each head and its article;
 (q) means responsive to a specified vacuum being drawn in both vacuum heads to withdraw said side guards and to reverse the power cylinders;

(r) means for separating the articles while they are suspended by vacuum heads;
 (s) means responsive to the power cylinders being retracted to swing the support arm to its second position to bring the articles over the container;
 (t) means responsive to the support arm being in the second position to extend the power cylinder to lower the articles into the container;
 (u) means responsive to the power cylinders stalling on the container bottom or an article already in the container to release the vacuum from the vacuum heads and to reverse the power cylinders.

5. A loading machine according to claim 4, wherein a loading horn is supported in vertical registry over the container and includes downwardly inclined guides overlapping the container walls openable to guide the articles into the container.

6. A machine for loading, into a container, a plurality of articles suitable for vacuum lifting, such as bales of rubber, comprising the combination of:
 (a) an accumulator bed spaced from the container;
 (b) pusher means located adjacent the accumulator bed to position articles thereon in accordance with a predetermined sequence;
 (c) side guards upstanding from the accumulator bed;
 (d) means to move the side guards toward one another proportioned distances to center the articles on the accumulator bed;
 (e) a support arm mounted to oscillate about a vertical axis spaced from both the accumulator bed and container;
 (f) a plurality of vacuum heads supported by the support arm and movable to positions in vertical registry over each of the articles, respectively, on the accumulator bed;
 (g) means to lower the vacuum heads against the articles;
 (h) means to connect a vacuum to the vacuum heads for establishing a firm connection between each head and its article;
 (i) means to withdraw said side guards;
 (j) means to elevate the vacuum heads for separating the articles while they are suspended by the vacuum heads;
 (k) means to swing the support arm to bring the articles over the container;
 (l) means to lower the articles into the container;
 (m) means to release the vacuum from the vacuum heads.

7. A machine for loading, into a container a plurality of articles suitable for vacuum lifting, such as bales of rubber, comprising the combination of:
 (a) an accumulator bed for supporting the articles;
 (b) a loading platform spaced horizontally from the accumulator bed for supporting said container;
 (c) a pusher mechanism including a support bed adjacent the accumulator bed and a pusher movable over the support bed;
 (d) a conveyor adjacent the support bed for supporting the articles thereon;
 (e) means to power the conveyor for positioning a first article on the support bed;
 (f) means responsive to said first article being positioned on the support bed to bias the pusher against said article for moving the same onto the accumulator bed;
 (g) means responsive to the pusher being extended its full stroke to retract the pusher;
 (h) means responsive to the pusher being retracted to power the conveyor for positioning the second article on the support bed to cause thereafter said second article to be biased onto the accumulator bed;
 (i) a side guard upstanding from the accumulator bed opposite the pusher;
 (j) means connecting the pusher and side guard together to cause them to move toward one another proportioned distances to center the first and second articles on the accumulator bed;

(k) a support arm mounted to oscillate about a vertical axis spaced from both the accumulator bed and loading platform to present, in a first position, its free end over the accumulator bed, and in a second position, its free end over said container;

(l) first and second power cylinders secured to the free end of the support arm and vertically aligned with the first and second articles on the accumulator bed, respectively;

(m) a vacuum head connected to the lower end of each power cylinder;

(n) means responsive to both the first and second articles being positioned on the accumulator bed to extend the power cylinders to lower the vacuum heads against the articles;

(o) means responsive to the power cylinders stalling on the articles to connect a vacuum to the vacuum heads for establishing a firm connection between each head and its article;

(p) means responsive to a specified vacuum being drawn in both vacuum heads to withdraw said side guards and to reverse the power cylinders;

(q) means to swing the support arm to its second position to bring the articles over the container;

(r) means to extend the power cylinder to lower the articles into the container;

(s) means responsive to the power cylinders stalling on the container bottom or an article already in the container to release the vacuum from the vacuum heads and to reverse the power cylinders.

8. A machine for loading, into a container, a plurality of articles suitable for vacuum lifting, such as bales of rubber, comprising the combination of:

(a) an accumulator bed spaced from the container;

(b) a pusher mechanism including a support bed adjacent the accumulator bed and a pusher movable over the support bed;

(c) an article conveyor adjacent the support bed;

(d) means to power the conveyor for positioning a first article on the support bed;

(e) means to bias the pusher against said first article for moving the same onto the accumulator bed;

(f) means to retract the pusher;

(g) means to power the conveyor for positioning the second article on the support bed to cause thereafter said second article to be biased onto the accumulator bed;

(h) a side guard upstanding from the accumulator bed opposite the pusher;

(i) means to cause the pusher and side guard to move toward one another proportioned distances to center the first and second articles on the accumulator bed;

(j) a support arm mounted to oscillate about a vertical axis spaced from both the accumulator bed and container;

(k) first and second power cylinders secured to the support arm and vertically alignable with the first and second articles on the accumulator bed, respectively;

(l) a vacuum head connected to the lower end of each power cylinder;

(m) means to extend the power cylinders to lower the vacuum heads against the articles;

(n) means to connect a vacuum to the vacuum heads for establishing a firm connection between each head and its article;

(o) means to withdraw said side guards and to reverse the power cylinders;

(p) means to swing the support arm to bring the articles into the container;

(q) means to extend the power cylinder to lower the articles into the container;

(r) means to release the vacuum from the vacuum heads and to reverse the power cylinders.

9. A machine for loading, into a container, a plurality of articles suitable for vacuum lifting, such a bales of rubber, comprising the combination of:

(a) an accumulator bed spaced from the container for supporting the articles;

(b) a pusher mechanism including a support bed adjacent the accumulator bed and a pusher movable over the support bed;

(c) a conveyor adjacent the support bed;

(d) means responsive to the pusher being fully retracted to power the conveyor for positioning a first article on the support bed;

(e) means responsive to said first article being positioned on the support bed to bias the pusher against said article for moving the same onto the accumulator bed;

(f) means responsive to the pusher being extended its fullstroke to retract the pusher;

(g) means responsive to the pusher being retracted to power the conveyor for positioning the second article on the support bed to cause thereafter said second article to be biased onto the accumulator bed;

(h) a side guard upstanding from the accumulator bed opposite the pusher;

(i) means connecting the pusher and side guard together to cause them to move toward one another proportioned distances to center the first and second articles on the accumulator bed;

(j) a support arm spaced from both the accumulator bed and container;

(k) a plurality of vacuum heads mounted on the support arm and movable to vertical alignment over the articles on the accumulator bed, and to over the container;

(l) means responsive to both articles being positioned on the accumulator bed to lower the vacuum heads against the articles;

(m) means to connect a vacuum to the vacuum heads;

(n) means responsive to a specified vacuum being drawn in both vacuum heads to withdraw said side guards and to elevate the vacuum heads;

(o) means to move the articles to the container;

(p) means to lower the articles into the container;

(q) means to release the vacuum from the vacuum heads and to elevate the vacuum heads.

10. A machine for loading, into a container, a plurality of articles suitable for vacuum lifting, such as bales of rubber, comprising the combination of:

(a) an accumulator bed spaced from the container for receiving the articles;

(b) support means located adjacent the accumulator bed for supporting articles thereon;

(c) transfer means for moving the articles from the support means to the accumulator bed in accordance with a predetermined sequence;

(d) side guards upstanding from the accumulator bed on opposite sides thereof;

(e) means responsive to the articles being positioned on the accumulator bed to move the side guards toward one another proportioned distances to center the articles on the accumulator bed;

(f) a support arm mounted to oscillate about a vertical axis spaced from both the accumulator bed and container to present, in a first position, its free end over the accumulator bed, and in a second position, its free end over said container;

(g) power cylinders secured to the free end of the support arm;

(h) a vacuum head connected to the lower end of each power cylinder and aligned vertically over the articles on accumulator bed;

(i) means to extend the power cylinders to lower the vacuum heads against the articles;

(j) means to connect a vacuum to the vacuum heads;
(k) means to withdraw said side guards and to reverse the power cylinders;
(l) means to swing the support arm to its second position to bring the articles over the container;
(m) means to extend the power cylinder to lower the articles into the container;
(n) means to release the vacuum from the vacuum heads and to reverse the power cylinders.

References Cited

UNITED STATES PATENTS

| | | | |
|---|---|---|---|
| 2,904,944 | 9/1959 | Notredame et al. | 53—61 |
| 3,099,906 | 8/1963 | McCase et al. | 53—59 |
| 3,292,341 | 12/1966 | Frost | 53—61 |
| 3,327,450 | 6/1967 | Carter | 53—61 |

TRAVIS S. McGEHEE, *Primary Examiner.*

R. L. FARRIS, *Assistant Examiner.*